(12) United States Patent
Benkstein (10) Patent No.: US 9,792,312 B2
(45) Date of Patent: Oct. 17, 2017

(54) ROW IDENTIFICATION COLUMN AUTHORIZATION PROFILES

(71) Applicant: Frank Benkstein, Karlsruhe (DE)

(72) Inventor: Frank Benkstein, Karlsruhe (DE)

(73) Assignee: SAP SE, Walldorf (DE)

( * ) Notice: Subject to any disclaimer, the term of this patent is extended or adjusted under 35 U.S.C. 154(b) by 731 days.

(21) Appl. No.: 13/686,743

(22) Filed: Nov. 27, 2012

(65) Prior Publication Data

US 2014/0149367 A1 May 29, 2014

(51) Int. Cl.
*G06F 17/30* (2006.01)

(52) U.S. Cl.
CPC .. *G06F 17/30345* (2013.01); *G06F 17/30551* (2013.01)

(58) Field of Classification Search
CPC ........... G06F 17/30153; G06F 17/3028; G06F 17/30345; G06F 17/30551
USPC ................................................. 707/693, 802
See application file for complete search history.

(56) References Cited

U.S. PATENT DOCUMENTS

| | | | | |
|---|---|---|---|---|
| 5,459,860 A * | 10/1995 | Burnett | ............. | G06F 17/30575 |
| 5,649,181 A * | 7/1997 | French | ............. | G06F 17/30324 |
| 5,794,228 A * | 8/1998 | French | ............. | G06F 17/30315 |
| 6,366,902 B1 * | 4/2002 | Lyle | ................. | G06F 17/30315 |
| | | | | 707/782 |
| 7,079,056 B2 * | 7/2006 | Weaver | .................. | H03M 7/46 |
| | | | | 341/106 |
| 7,548,928 B1 * | 6/2009 | Dean | ................. | G06F 17/30985 |
| 7,904,432 B2 * | 3/2011 | McKay | ............. | G06F 17/30345 |
| | | | | 707/693 |
| 8,285,691 B2 * | 10/2012 | Shuma | ............. | G06F 17/30312 |
| | | | | 707/693 |
| 8,312,026 B2 * | 11/2012 | Vo | ..................... | G06F 17/30595 |
| | | | | 707/705 |
| 2005/0165807 A1 * | 7/2005 | Srinivasan | ........ | G06F 17/30595 |
| 2009/0254516 A1 * | 10/2009 | Meiyyappan | ..... | G06F 17/30492 |
| 2010/0114843 A1 * | 5/2010 | Farrar | ............... | G06F 17/30336 |
| | | | | 707/693 |
| 2010/0281004 A1 * | 11/2010 | Kapoor | ............. | G06F 17/30501 |
| | | | | 707/693 |
| 2011/0082854 A1 * | 4/2011 | Eidson | ............... | G06F 17/30463 |
| | | | | 707/714 |
| 2011/0246432 A1 * | 10/2011 | Yang | .................. | G06F 17/30315 |
| | | | | 707/693 |
| 2011/0258225 A1 * | 10/2011 | Taylor | ............... | G06F 17/30336 |
| | | | | 707/769 |
| 2012/0124016 A1 * | 5/2012 | Barsness et al. | ............ | 707/693 |
| 2012/0296883 A1 * | 11/2012 | Ganesh | ............. | G06F 17/30315 |
| | | | | 707/693 |
| 2014/0074805 A1 * | 3/2014 | Kapoor | ............. | G06F 17/30501 |
| | | | | 707/693 |

\* cited by examiner

*Primary Examiner* — Nargis Sultana
(74) *Attorney, Agent, or Firm* — Mintz Levin Cohn Ferris Glovsky and Popeo, P.C.

(57) ABSTRACT

Tables in a database can include an internal RowID column. For each new row or new version of a row in the table, a new RowID can be assigned and stored in the RowID column. RowID values can be stored using either or both of range compression and block compression, or other compression approaches. In response to receipt of a query of the database table, at least one of a forward look up and a reverse lookup of a DocID value associated with a specific RowID value can be performed.

20 Claims, 6 Drawing Sheets

ROW IDENTIFICATION COLUMN AUTHORIZATION PROFILES

TECHNICAL FIELD

The subject matter described herein relates to authorization profiles for use with a row identification column (also referred to as a RowID column) in a database.

BACKGROUND

A database management system can support temporal tables that allow queries against an historical state of the data. In some implementations of such an approach, write operations on temporal tables do not physically overwrite existing records. Instead, write operations can insert a new version of a data record into the database without overwriting the prior version. The different versions of a data record have timestamps indicating their validity (e.g. the version of the data record having the most recent time stamp is the valid version and all versions with older time stamps are not valid. This approach allows an application to request processing of subsequent queries against a historical view of the database.

In addition to enabling features relating to tracking of valid or invalid versions of data records, a database management system can advantageously be capable of maintaining data according to its age. In general, data can be regarded as aged if it is no longer needed during normal business (which includes transactional processing as well as reporting use cases). Data that is only rarely accessed need not be kept in storage with high access speeds. For example, for a high performance, in-memory database, aged data or data that are rarely accessed can be transitioned from relatively expensive random access memory (RAM) to lower-cost hard disk drives, tape drives, optical media, or the like. The rules that define when a data item is aged can typically be defined by an application developer, a programmer, some other administrator, or the like for each type of data item (which may be for example a table, business object, a data cube, or the like). A typical aging rule might define that a sales order is aged if it is closed for 90 days.

SUMMARY

In one aspect, a method includes assigning, to at last one of a new row and a new version of a row added to a database table, a RowID value, storing the RowID value in a RowID column of the table, compressing the RowID column according to a compression approach, and accessing the RowID column in response to receipt of a query of the database table to perform at least one of a forward lookup and a reverse lookup of a DocID associated with a specific RowID value. The RowID includes a sequential integer value. The DocID value includes a numerical identifier associated with at least one of a document and a value associated with the row of the database table corresponding to the specific RowID value. The method further includes returning, based on the least one of the forward lookup and the reverse lookup, at least one of the specific RowID or the DocID associated with the RowID.

In optional variations, one or more of the following features can also be included in any feasible combination. The compression approach can optionally include range compression, block compression, or some other compression approach. A one-to-one mapping can exist between the RowID value and the DocID value. The DocID value can optionally include a signed 32-bit integer key or position serving as a numerical identifier associated with the document. A plurality of rows in the table can optionally be reordered, thereby resulting in a new DocID being assigned to a row identified by the RowID.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Methods, systems, articles of manufacture, and the like consistent with one or more implementations of the current subject matter can, among other possible advantages, provide a RowID column that is included in each table in a database. A RowID can be an unsigned 64-bit integer number assigned to any new version of a row. For each new row (e.g. a row added via a SQL "INSERT" or the like) or new version of a row (e.g. a new version of a row added via a SQL "UPDATE" or the like) a new RowID is assigned and stored in the RowID column. The RowID column can be queried like any other column in a table. However, this column can optionally be hidden. In an example in which an implementation of the current subject matter is used in association with SQL, the RowID column can optionally be represented as a DECIMAL(18, 0) column. In other languages, the RowID column can be represented as an integer column (e.g. no digits after the decimal point).

A one-to-one mapping can exist between a DocID and a RowID. In this context, a DocID can be a signed 32-bit integer key or position that serves as a numerical identifier associated with a document. The DocID can indicate a position of a row in a table or other database structure. While rows in a table can be reordered, thereby resulting in a new DocID being assigned to the row, the RowID of the row is retained regardless of reordering of the rows. For every DocID, exactly one. RowID or a NULL value can exist. Each RowID is therefore stored once or not at all. Each table in a database can have an internal RowID column and a number called the max-RowID. When the table is created, the max-RowID can be initially 0. However, this value is not used. The value of the new RowID can be generated by incrementing (atomically, e.g. by a fixed minimum value such as for example 1) the previous max-RowID by one. If multiple rows are added at the same time, the max-RowID(r) for a current number of rows r, is incremented (again atomically) by the number of newly added rows (n). Each new row is assigned, in sequence, a RowID value from the values r+1 to r+n, and the new max-RowID is r+n.

In general, database tables can include a main part and a delta part. For example, in a columns store arrangement, new data is first appended to the delta part and only at some point later "merged" into the main part. The delta part is therefore typically optimized for read and append operations while the main part is more typically read-optimized.

In a delta log, a table update can generate a RowID for each new row. Actions can be written to the delta log with reference to the RowID. Updates and inserts of rows are generally logged by reference to a new RowID mapped from a previous RowID. During a replay of actions logged in the delta log, actions are replayed by looking up the affected rows based on their RowID values. This approach provides stability and allows for non-persisted merges and merging during replay.

A further advantage can be realized in that, for large query result sets, only RowIDs of the retrieved rows need to be stored or returned as a result. For example, this feature can allow the use of "late materialization" in a column store arrangement. Late materialization generally refers to an approach of leaving data in a column store arrangement as long as possible. In contrast, an "early materialization" approach involves creating a row representation of the column store data at a first or some other relatively early intermediate step of a query or other data operation. Further advantages can be realized in that actual requested attributes can be read blockwise to save memory. This approach can be used for all types of SELECT functions (e.g. INSERT INTO . . . SELECT . . . ). Text attributes can optionally be processed "lazily" (e.g. after an insert). A queue server can refer by RowID to rows where a processing result is to be stored.

Consistent with implementations of the current subject matter, RowIDs can be used in a variety of applications or use cases including, but not limited to partitioning, history, query optimization, or the like. Each history part of a table can have its own RowID column. When selecting from the RowID column, the upper 10 bits can be used for the part ID. Selecting RowIDs from the history part allows RowID values to obtain their 11th (or 54th) bit set. When selecting or updating, a query optimizer can use the upper 11 bits to direct the query to the correct (history) part. In some implementations of the current subject matter, the actual column can store only the lower 53 bits. As an example, a RowID with the same leading digits as 18014398509481985 ($2^{54}$) or 36028797018963969 ($2^{55}$) can indicate a row in a partitioned table (from part 1 or 2 respectively) while a RowID such as 9007199254740993 ($2^{53}$) can indicate a row from a history part.

The RowID column of a column store table can look and behave similarly to other columns in that it can have a main part and a delta part. In the delta part, RowIDs can be sorted to ascend by DocID (except if there are concurrent transactions). In general, RowID values cannot include duplicates within a table. For a delta part of a table, implementations based on B-Tree attributes as well as those based on delta identifier (DeltaID) attributes are within the scope of the current subject matter. A B-Tree implementation can include as many values as DocIDs with most already sorted. In another implementation, RowIDs can be sorted to be ascending with regard to the DocID, and nulls can be ignored. This approach can involve reserving DocIDs and RowIDs simultaneously. Updates can be performed out of order, but holes can be filled with lower RowIDs. Compression can occur with similar techniques as those applied to the main part. Compression can also occur in the background with a buffer for inserts In the main part, RowIDs can sometimes (but not always) be sorted to ascend by DocID. Again, duplicate values of the RowID in a table are generally not allowed. For a main part of a table, implementations identifier attributes are within the scope of the current subject matter. RowID compression can be used in the main part. Low memory consumption is desirable as are fast forward lookup: position (DocID) to value (RowID) and fast reverse lookup: value (RowID) to position (DocID).

Examples of configurations that are consistent with implementations of the current subject matter can include, but are not limited to inclusion of a fixed offset (which can optionally be zero) between DocID and RowID. In one example scenario, inserts can occur in non-overlapping transactions, which results in no deletes or updates (e.g. import). Such inserts can be stored very efficiently. In another example, values can be in a random order, for example because of the application of a compression optimization routine (e.g. OptimizeCompression) that reorders the rows or if a table experiences many disjunct updates, deletes, merges, or the like. Such compression optimization routines can include operations designed to improve overall compression of a table by reordering all rows in all columns. For example, if a contains values [a,b,a,b,a,b] it could be reordered to [a,a,a,b,b,b] to thereby improve compression. Other configurations that fall between these two examples are also within the scope of the current subject matter.

Consistent with implementations of the current subject matter, main part RowID information can be stored using one or more of a "range" compression approach and a "block" compression approach. In each of these approaches, a "value" part stores the data and a reverse index part is created only when needed and used to perform a lookup between a RowID and a DocID. The type or type of compression used can optionally be configured globally, for example with a configuration parameter.

Using the range compression approach, values can be stored using a bitvector that stores valid positions. As used herein, a bitvector is a vector of sorted integers represented as an bit-array with the maximum value determining the length. A set bit indicates that a value is included. An implementation in which a bitvector stores valid positions can generally include lists of position and value offsets (which can, for example, be index vectors of DocIDs and ranges) along with the bitvector of valid positions. For every (DocID, RowID) pair stored, a bit in the bitvector is set based on the DocID (i.e. the "DocID$^{th}$" bit is set). New (DocID, RowID) pairs can be sorted and checked for a "range" property. If more than one (DocID, RowID) pair has the same offset (DocID−RowID), only the first such pair is stored. In other words, a range of successive DocIDs with a same offset can be replaced by the first value in the range. The pairs can be stored as two separate vectors sorted by the first vector. When a NULL is encountered the previous range can be continued.

Figure 1A:
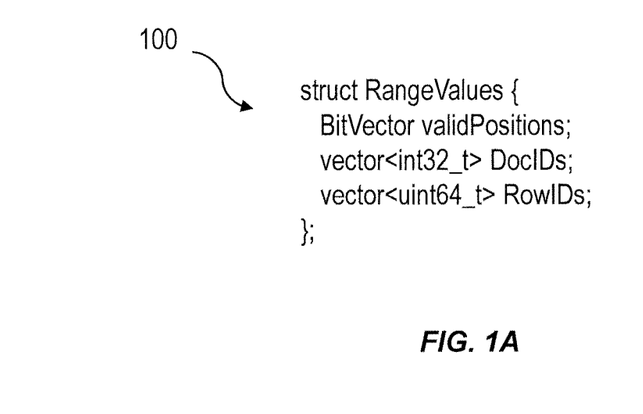
FIG. 1A, FIG. 1B, and FIG. 1C show code structure examples illustrating features consistent with one or more implementations of the current subject matter.

For a lookup going from DocID to RowID, the DocID is first checked against the bitvector. If this check returns a logical FALSE, a "value-not-found" is returned. Otherwise, a binary can be performed done against the DocID vector. An insertion point index i and a value DocID(0) at the insertion point are persisted. Then, the RowID(0) at the insertion point index i is acquired by a lookup in the second vector, and the value of RowID(0)+[DocID−DocID(0)] is returned. FIG. 1A shows an example code structure 100 illustrating how this approach can be implemented. The two vectors DocIDs and RowIDs can be stored in a bit-compressed manner. That is, only the number of bits needed to store the maximum value need be used to store each value.

Figure 1B:
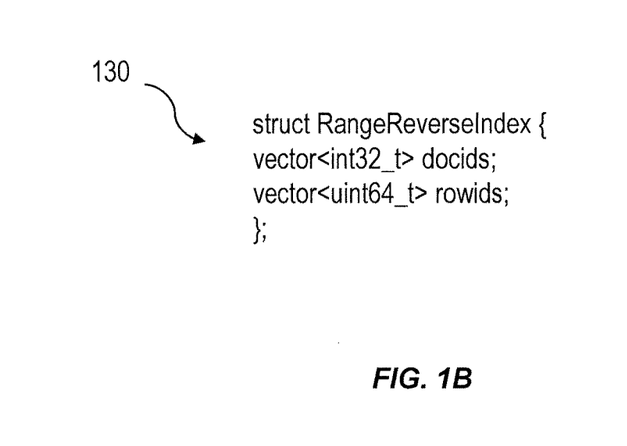

For a reverse index range compression, both index vectors can be taken in a combined sort by value, and an at least approximate lookup can occur by a binary search. An index vector as used herein generally refers to a "bit-compressed vector," which is a vector of integers in which a number of bits needed for the maximum value is used to represent values in memory. Such an approach can be sensitive with regards to reordering, for example as might occur in a compression optimization routine. In a reverse lookup approach, the vectors can be sorted by RowID instead of DocID. FIG. 1B shows an example code structure 130 illustrating how this approach can be implemented. The structure 130 can, in some examples, yield very good compression. However certain operations that seek to improve overall compression by reordering rows can rearrange the (DocID, RowID) pairs into a random order and thereby destroy such a compression scheme. Other operations, such as updating every second row also have that capability but tend to happen comparatively rarely.

Block compression can be used in some implementations of the current subject matter to address problems that can arise in conjunction with the use of a compression optimization relying on reordering or rows. In an example, block compression with an interval tree can be used. For example, the values can be divided into blocks of 1024 (or some other number of) values. Each block can be compressed individually, for example using an optionally automated choice of the best compression for each block. Each block can store state, minValue, and maxValue information. Possible compression types for the individual blocks can include range compression, index vector (sequence) compression, and compression using differences (e.g. storing a difference to a previous value and also storing some number, for example 16, intermediate values so at most a maximum number of additions, for example 64, are required). Storage of nulls (e.g. in a vector) or non nulls (e.g. in a bitvector) can optionally be performed only when necessary.

When block compression is done without a reverse index, each block can be viewed as an interval (min value, max value). An interval tree can be built, and lookup can include finding candidate blocks and scanning those blocks that are found. If a block is sorted, the scan of that block can be on the order of log(n) where n is the number of values in the block. If intervals are mostly non-overlapping, the access time can be on the order of log(n), and memory usage can be on the order of log(n/1024) assuming that the block size is 1024. If the intervals are totally overlapping, access time is on the order of n for a scan. Memory usage for the interval tree can be almost constant (very few nodes)

Block compression with a reverse index can also be used. A vector of values and block indices can be used in a combined sort. Values can be compressed using block compression, optionally with an interval tree for fast access. Block indices can optionally be stored as an index vector.

The values can be divided into blocks of 1024 DocID-value pairs and each of these blocks in compressed separately. Each block is seen as a separate (index, RowID) container with the index being between 0 and 1023 inclusively. The block also stores its minimum and maximum values separately, also a Boolean value that indicates whether the values in the block are sorted.

A best (e.g. best optimized, least resource intensive, etc.) of one or more available compression schemes can be chosen for each block. In a sequential compression scheme, values can stored in a bit-compressed vector. A NULL value can be encoded by setting it to the next valid value. In other words, a value at index i can be NULL when the value at i+1 is the same. This is possible when there are no duplicate values. When there are trailing NULL values at the end of a value vector, the value vector can be truncated to store only the maximum valid index.

The values in a block can also be compressed according to the previously described range-compression scheme, applied only to 1024 at maximum. In case of NULLs in the block a bitvector of valid positions or an index vector of NULL positions can be stored. If there is only one range only the valid-positions or NULLs vector is stored because the minimum value together with the position of the block indicates the range (DocID=1024*blockIndex). However, if there are no NULL values in a block with a single range, the minimum and maximum values can adjusted by subtracting 1024*blockIndex. If this gives the same values as the previous block, a new reference to the previous block can be stored instead to conserve memory.

If the values in a block are sorted and the zero index is valid (and therefore the minimum value), only the differences to the previous value needs to be stored for each index.

Figure 1C:
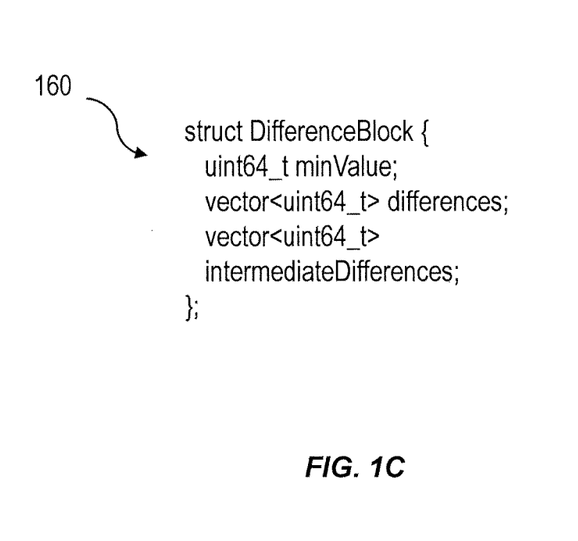

For faster read access, an intermediate value can be stored at a fixed or variable interval (for example every 64 positions) as well. A NULL value is encoded as with a zero difference. The data structure can in some implementations resemble the example code segment 160 shown in FIG. 1C. For lookup at index i it is first divided by 64 to get the value j. The return value v is then set to the minValue and incremented by the intermediateDifferences[0] to intermediateDifferences[j]. After that it is also incremented by the values differences[64*j] to differences [i].

A reverse lookup can be accomplished using either or both of a shallow reverse index scheme and a full reverse index scheme. In implementations of the current subject matter featuring a shallow reverse index, the blocks can be treated as intervals with their minimum and maximum values as boundaries. These blocks can be placed into an interval tree. To look up the DocID for a RowID value, a list of "candidate" blocks that may contain the value can be found using the interval tree. Each of these candidate blocks can be searched individually. Depending on whether the block is sorted internally, such a search can be performed as a kind of binary search. In other implementations of the current subject matter, such a search can be performed as a scan.

Figure 2A:
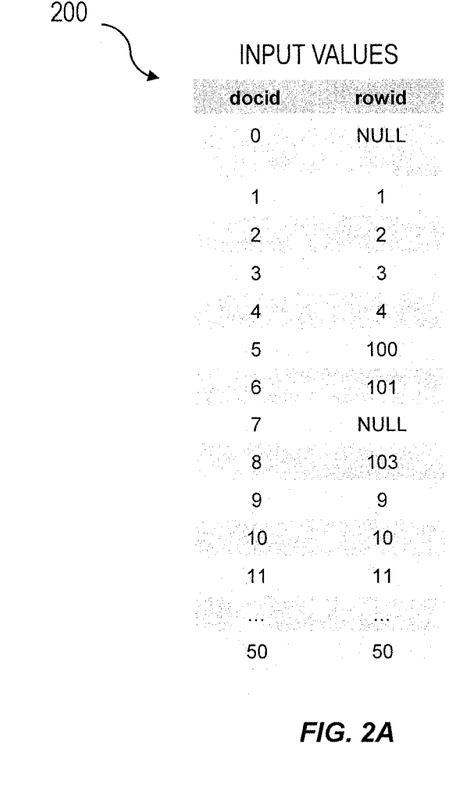
FIG. 2A, FIG. 2B, FIG. 2C, and FIG. 2D show a table of input values, a table of DocID and RowID range vectors, a bitvector, and a reverse index, respectively, that are consistent with implementations of the current subject matter.
Figure 2B:
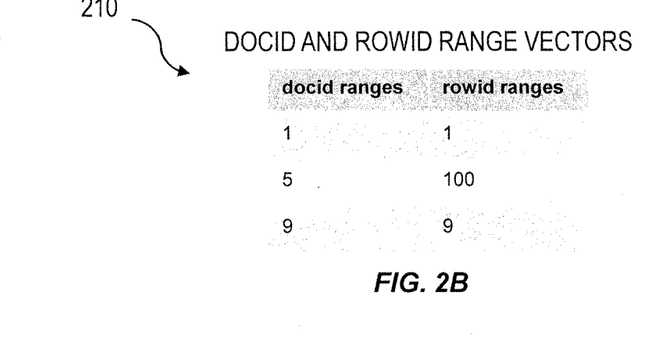
Figure 2C:
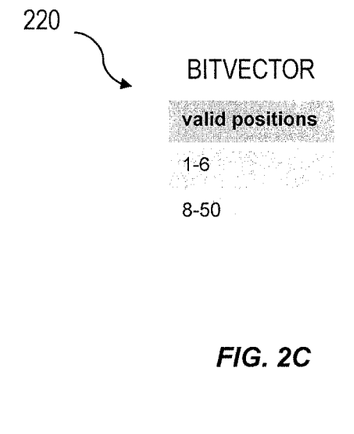
Figure 2D:
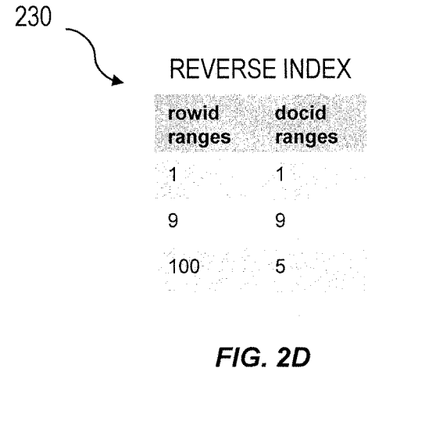

A bitvector as used herein can track valid DocIDs. A lookup can be performed by checking against the bitvector followed by a binary search. As an illustration of features consistent with this aspect of the current subject mater, FIG. 2A, FIG. 2B, FIG. 2C, and FIG. 2D respectively show a table 200 of input values, a table 210 of DocID and RowID range vectors, a bitvector 220, and a reverse index 230. In a random value configuration, a range entry can be made in the DocID and RowID range vectors 210, a bitvector entry can be made in the bitvector 220, and a reverse index entry can be made in the reverse index 230. Thus, as shown in FIG. 2A, FIG. 2B, FIG. 2C, and FIG. 2D, a list of DocIDs in the input values table 200 can include [NULL, 1, 2, 3, 4, 100, 101, NULL, 103, 9, 10, 11]. The DocID and RowID range vectors for these values can be [1, 5, 9], [1, 100, 9] as shown in FIG. 2B, and the bitvector can be [1-6, 8-50]. When new rows are inserted into the input values table 210, for example, 10 new rows (51,51)-(60,60), the bitvector 220 can be modified by appending 10 true bits. The memory requirement for appending 1 64-Bit value is roughly 1 Bit in this configuration.

In implementations of the current subject matter featuring a full reverse index, uncompressed vectors for the DocIDs and RowIDs can be generated by uncompressing all blocks. These uncompressed vectors can then be sorted by the RowIDs. The resulting uncompressed, sorted RowID vector can be again compressed block-wise using one or more of the techniques discussed above. A shallow reverse index can be created for those blocks. The DocID values can be divided by 1024 to yield a list of block-indices and then stored in a bit-compressed vector.

Consistent with implementations of the current subject matter, a RowID can be first looked up in a shallow reverse index of the sorted values to obtain an index value i. Using the index value i a block index bi is looked up in the block-indices vector. Then the actual DocID is found by searching in the actual block at bi.

An approach using block-compression with a shallow reverse index can be implemented to address issues that can arise in association with a compression optimization routing (e.g. OptimizeCompression as discussed above). In other implementations of the current subject matter, a change was made to OptimizeCompression so that when reordering was done the blocks of 1024 values were also sorted again by the RowID values. Memory consumption can thereby be improved, although in large data sets such an approach can cause the resources (e.g. one or more of time, processors, memory etc.) required for a RowID to DocID lookup to exceed desirable levels. A full reverse index can be used to address these issues. Using a full reverse index, resource consumption between 20% and 40% less than the range compression on the observed workloads but is still quite fast.

Figure 3:
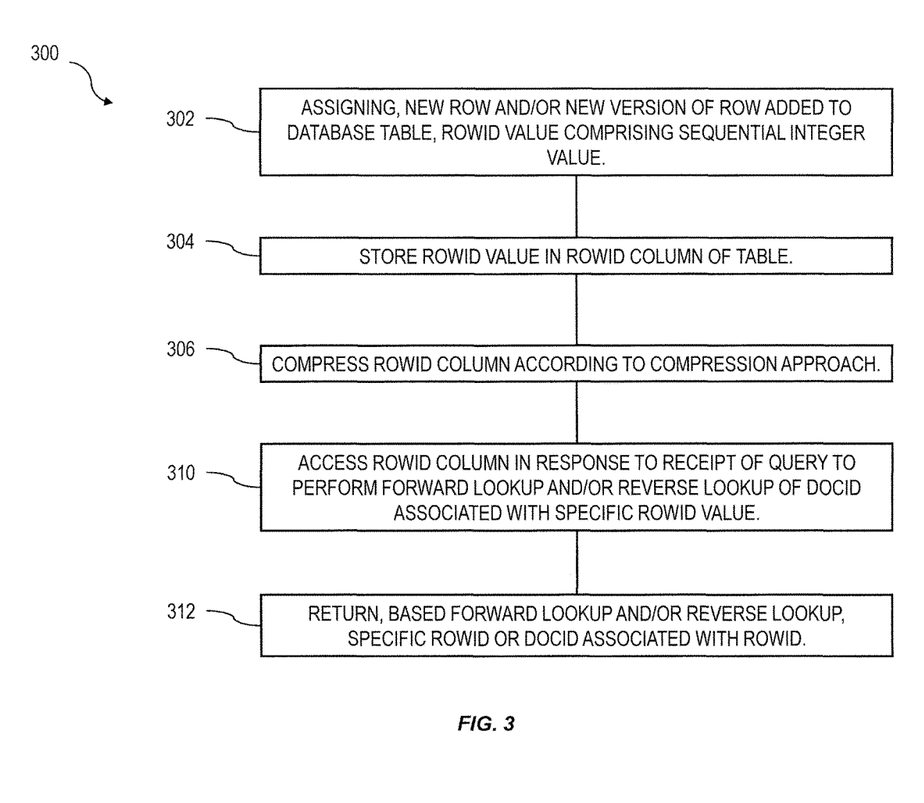
FIG. 3 is a process flow diagram illustrating aspects of a method having one or more features consistent with implementations of the current subject matter.

FIG. 3 shows a process flow chart 300 illustrating method features that can occur in one or more implementations of the current subject matter. At 302, a RowID value that can be a sequential integer value is assigned to at last one of a new row and a new version of a row added to a database table. The RowID value is stored in a RowID column of the table at 204, and the RowID column is compressed at 206 according to a compression approach (e.g. one of the compression approaches discussed above). At 310, the RowID column is accessed in response to receipt of a query of the database table to perform at least one of a forward lookup and a reverse lookup of a DocID associated with a specific RowID value. Based on the least one of the forward lookup and the reverse lookup, at least one of the specific RowID or the DocID associated with the RowID is returned in response to the query at 312.

Figure 4:
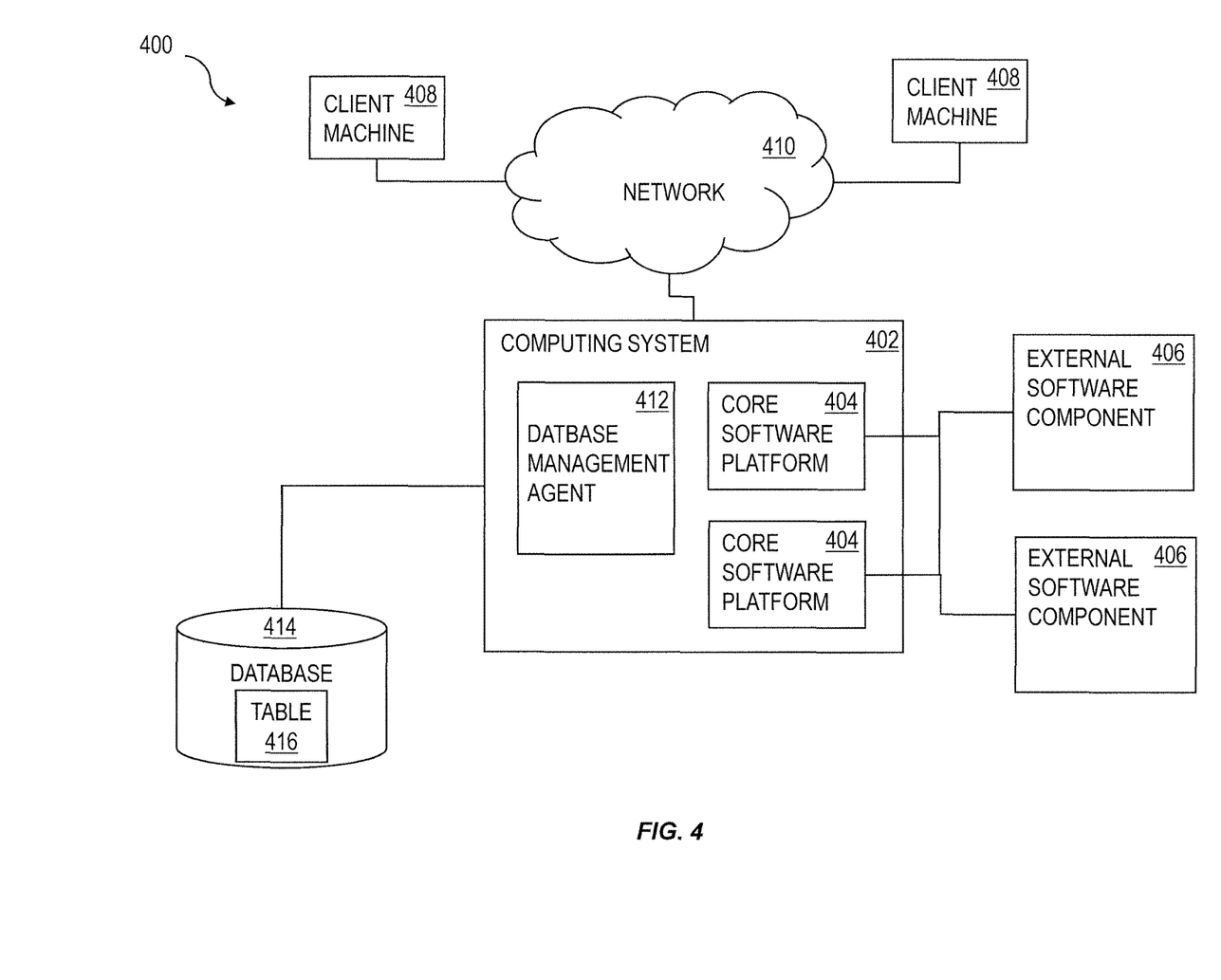
FIG. 4 is a diagram illustrating features of a business software system architecture consistent with at least some implementations of the current subject matter.

FIG. 4 shows a diagram of a system that can implement one or more features of the current subject matter. A computing system 402 can include one or more core software platform modules 404 providing one or more features of a business software system or other software that includes database management features. The computing system can also aggregate or otherwise provide a gateway via which users can access functionality provided by one or more external software components 406. One or more client machines 408 can access the computing system, either via a direct connection, a local terminal, or over a network 410 (e.g. a local area network, a wide area network, a wireless network, the Internet, or the like).

A database management agent 412 or other comparable functionality can access a database 414 that includes at least one table 416, which can in turn include at least one column. The database management agent 412 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 4 depicts an example of such a system.

Figure 5:
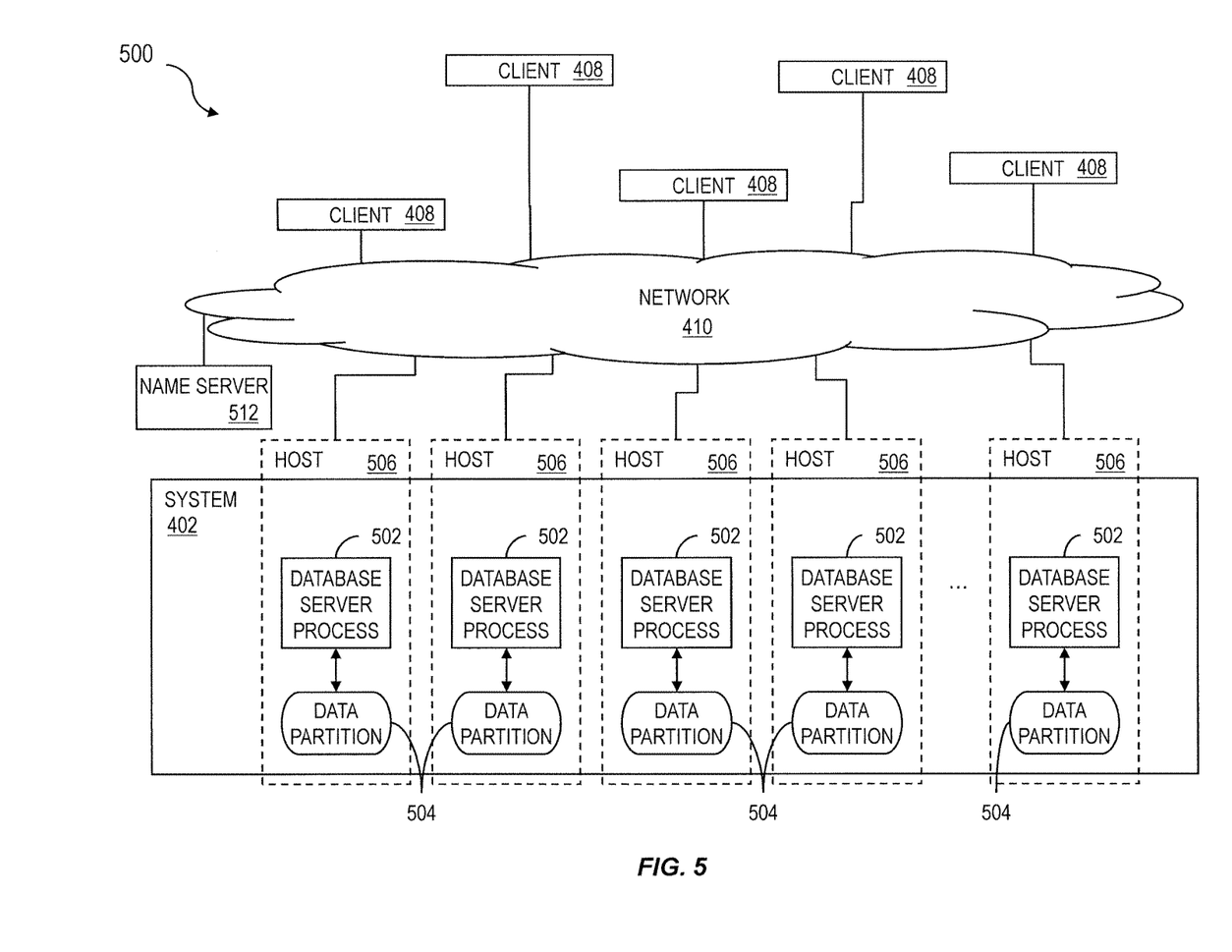
FIG. 5 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 5 shows an example of an enterprise resource system architecture 500 consistent with an implementation that includes data distribution for scalability reasons. Such a configuration can be used for large, on-premise or stand-alone systems with high performance requirements. Each data server process 502 and its associated data partition 504 can be assigned to a discrete host 506. A host 506 can be a standalone machine with one or more physical processors or a virtual machine on a larger system 402 as depicted in FIG. 5. A central component, labeled as a name server 512 in FIG. 5, knows the topology of the system and how data is distributed. In a system with data distribution, the name server knows which tables or partitions of tables are located on which data server process 502. One or more clients 514 (e.g. client machines 408) can access the name server 512, either via a direct connection or over a network 516.

In a data distribution scenario, the partitioning can be done table wise or also by splitting tables. With table wise partitioning, the name server assigns new tables to a database server process 502 based on the current distribution of tables (number of tables assigned to each database server process 502). Then data for this table will reside only on that database server process 502. It is also possible to specify that a table is split over multiple database server processes 502. The name server 512 can optionally partition the table based on a size estimation specified by the application. When records are inserted into a split table, the records can be distributed to other database server processes 502 based on name server information.

Smaller organizations can also benefit from use of business software functionality. However, such an organization may lack the necessary hardware resources, IT support, and/or consulting budget necessary to make use of a stand-alone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
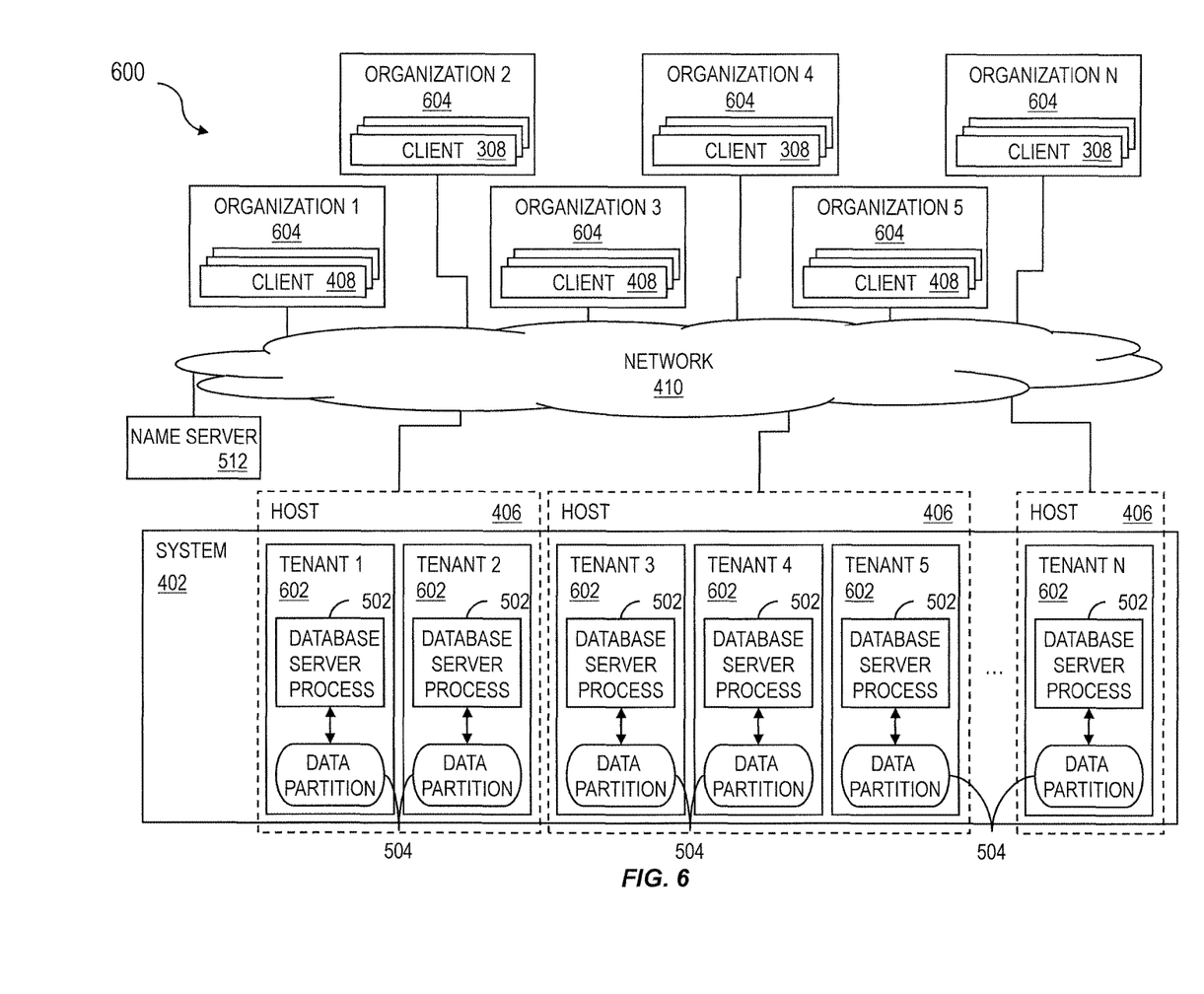
FIG. 6 is a diagram illustrating features of another database management system architecture consistent with at least some implementations of the current subject matter.

Data partitioning consistent with implementations of the current subject matter can also be used in a multi-tenancy environment as illustrated in the system architecture 600 of FIG. 6. Multiple tenants 602, each isolated from one another and available to be accessed by clients 514 within a separate organization 604 of a plurality of organizations via a network 516, can be hosted by a same host 506, which can be a virtual machine on a larger system 402 as shown in FIG. 6 or a separate system that includes one or more physical processors. Tenants 602 can also optionally be distributed across multiple database server processes 502 on more than one host 506. In this manner, tables or ranges within tables are assigned to different database server processes 502 that are assigned to different hosts 506 for scalability reasons. One or more tenants 602 can alternatively be served by a single database server process 502 accessing a data partition 504 (or multiple data partitions 504) for the respective tenant 602 that is isolated from other tenants 602.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network.

The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    assigning, to at least one of a new row and a new version of a row added to a database table, a RowID value comprising a sequential integer value;
    storing the RowID value in a RowID column of the database table;
    compressing the RowID column according to a compression approach;
    accessing the RowID column in response to receipt of a query of the database table to perform at least one of a forward lookup and a reverse lookup of a DocID associated with a specific RowID value, the DocID value comprising a numerical identifier associated with at least one of a document and a value associated with the row of the database table corresponding to the specific RowID value;
    returning, based on the least one of the forward lookup and the reverse lookup, at least one of the specific RowID or the DocID associated with the RowID.

2. A computer program product as in claim 1, wherein the compression approach comprises range compression.

3. A computer program product as in claim 1, wherein the compression approach comprises block compression.

4. A computer program product as in claim 1, wherein a one-to-one mapping exists between the RowID value and the DocID value.

5. A computer program product as in claim 1, wherein the DocID comprises a signed 32-bit integer key or position serving as a numerical identifier associated with the document.

6. A computer program product as in claim 1, wherein the operations further comprise reordering a plurality of rows in the table, the reordering resulting in a new DocID being assigned to a row identified by the RowID.

7. A system comprising:
    at least one programmable processor;
    a machine-readable medium storing instructions that, when executed by at least one programmable processor, cause the at least one programmable processor to perform operations comprising:
    assigning, to at least one of a new row and a new version of a row added to a database table, a RowID value comprising a sequential integer value;
    storing the RowID value in a RowID column of the database table;
    compressing the RowID column according to a compression approach;
    accessing the RowID column in response to receipt of a query of the database table to perform at least one of a forward lookup and a reverse lookup of a DocID associated with a specific RowID value, the DocID value comprising a numerical identifier associated with at least one of a document and a value associated with the row of the database table corresponding to the specific RowID value;
    returning, based on the least one of the forward lookup and the reverse lookup, at least one of the specific RowID or the DocID associated with the RowID.

8. A system as in claim 7, wherein the compression approach comprises range compression.

9. A system as in claim 7, wherein the compression approach comprises block compression.

10. A system as in claim 7, wherein a one-to-one mapping exists between the RowID value and the DocID value.

11. A system as in claim 7, wherein the DocID comprises a signed 32-bit integer key or position serving as a numerical identifier associated with the document.

12. A system as in claim 7, wherein the operations further comprise reordering a plurality of rows in the table, the reordering resulting in a new DocID being assigned to a row identified by the RowID.

13. A computer-implemented method comprising:
assigning, to at least one of a new row and a new version of a row added to a database table, a RowID value comprising a sequential integer value;
storing the RowID value in a RowID column of the database table;
compressing the RowID column according to a compression approach;
accessing the RowID column in response to receipt of a query of the database table to perform at least one of a forward lookup and a reverse lookup of a DocID associated with a specific RowID value, the DocID value comprising a numerical identifier associated with at least one of a document and a value associated with the row of the database table corresponding to the specific RowID value;
returning, based on the least one of the forward lookup and the reverse lookup, at least one of the specific RowID or the DocID associated with the RowID.

14. A computer-implemented method as in claim 13, wherein the compression approach comprises range compression.

15. A computer-implemented method as in claim 13, wherein the compression approach comprises block compression.

16. A computer-implemented method as in claim 13, wherein a one-to-one mapping exists between the RowID value and the DocID value.

17. A computer-implemented method as in claim 13, wherein the DocID comprises a signed 32-bit integer key or position serving as a numerical identifier associated with the document.

18. A computer-implemented method as in claim 13, further comprising reordering a plurality of rows in the table, the reordering resulting in a new DocID being assigned to a row identified by the RowID.

19. A computer-implemented method as in claim 13, wherein at least one of the assigning, the storing, the compressing, the accessing, and the returning are performed by a system comprising at least one programmable processor.

20. A computer program product as in claim 1, wherein the RowID column accessed in response to receipt of the query has been compressed according to the compression approach.

* * * * *